United States Patent [19]

Barrio de Mendoza

[11] 4,059,094

[45] Nov. 22, 1977

[54] SOLAR ENERGY COLLECTOR APPARATUS

[76] Inventor: Cayo Petronio Barrio de Mendoza, 2402 N. 39th Place, Phoenix, Ariz. 85008

[21] Appl. No.: 637,714

[22] Filed: Dec. 4, 1975

[51] Int. Cl.[2] .............................................. F24J 3/02
[52] U.S. Cl. .................................................. 126/271
[58] Field of Search ............................... 126/270, 271

[56] References Cited

U.S. PATENT DOCUMENTS

| 1,004,888 | 10/1911 | McIntyre | 126/271 |
| 3,321,012 | 5/1967 | Hervey | 126/271 |
| 3,923,039 | 12/1975 | Falbel | 126/271 |
| 3,929,122 | 12/1975 | Alkasab | 126/271 |
| 3,957,029 | 5/1976 | Nozik et al. | 126/270 |
| 3,957,031 | 5/1976 | Winston | 126/270 |
| 3,968,786 | 7/1976 | Spielberg | 126/270 |

FOREIGN PATENT DOCUMENTS 814,875   7/1937   France .............................. 126/270

*Primary Examiner*—John J. Vrablik
*Attorney, Agent, or Firm*—H. Gordon Shields

[57] ABSTRACT

Solar collector energy apparatus is disclosed which includes a parabolic reflective surface or parabolic mirror for receiving solar radiation and for focusing the radiation to a pipe disposed at a focal point of the mirror collector, and the pipe is also disposed in direct contact with the parabolic mirror collector so as to receive reflection from the mirror, and a heat chamber is included behind the parabolic mirror collector to trap heat behind the collector and thus provide an additional heat source for the pipe, and for fluid in the pipe.

13 Claims, 5 Drawing Figures

U.S. Patent
Nov. 22, 1977
4,059,094
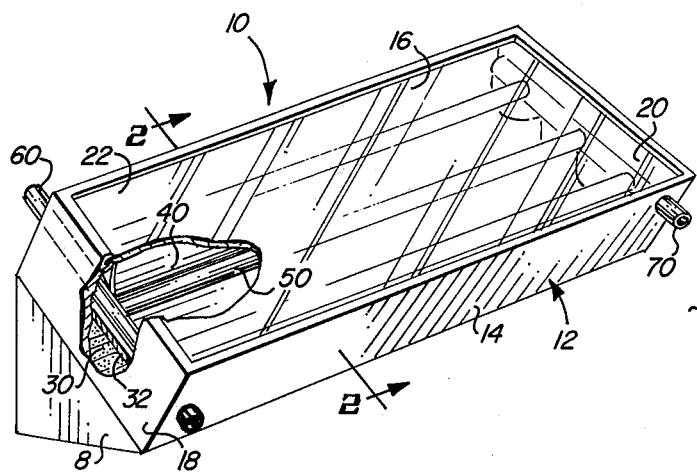
FIG-1
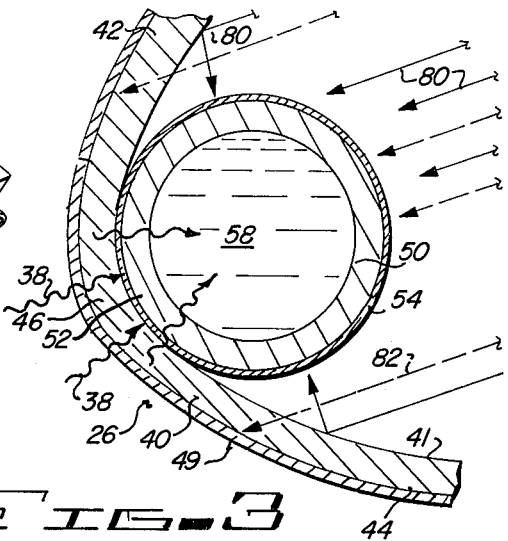
FIG-3
FIG-4
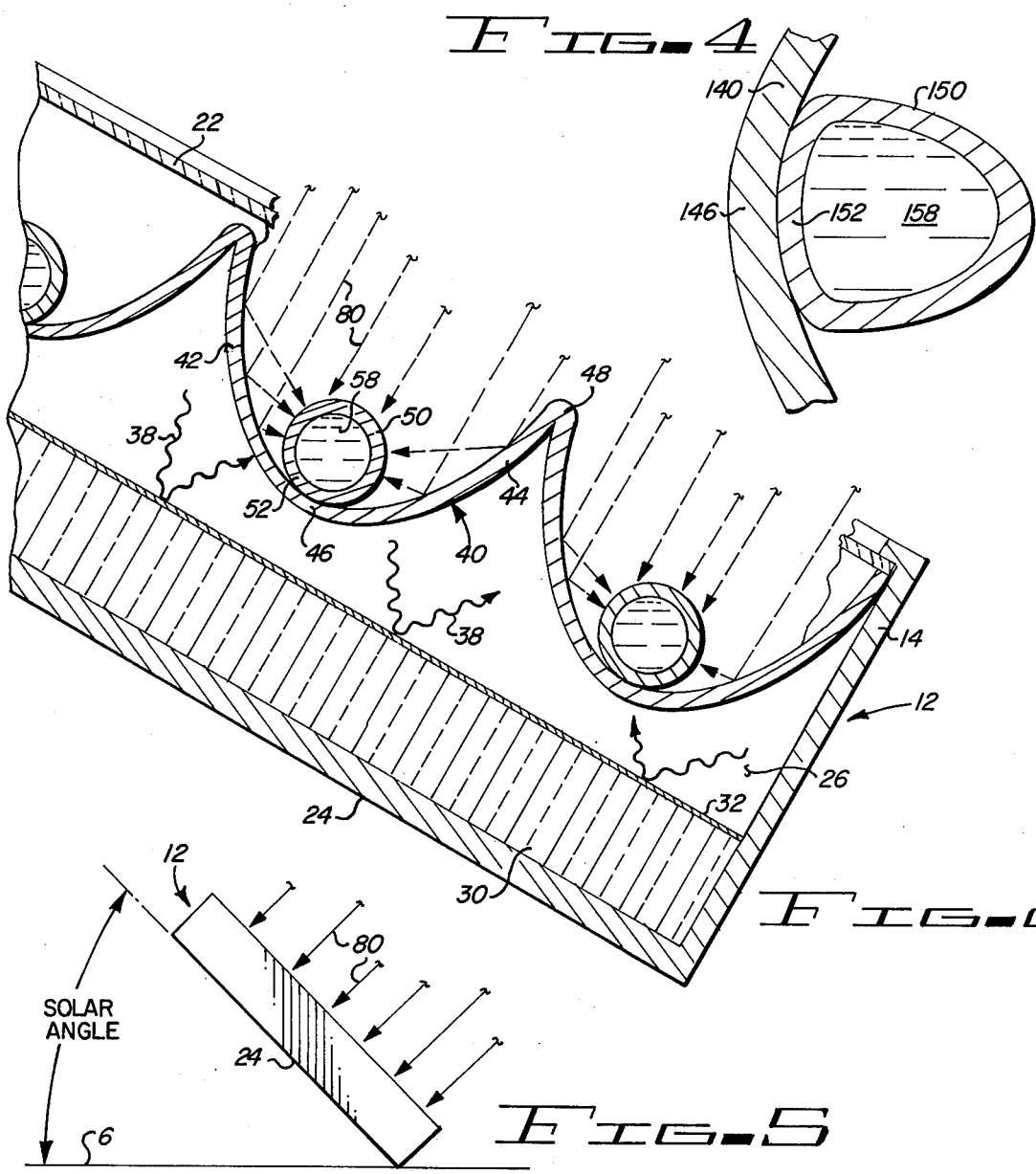
FIG-2
FIG-5

SOLAR ENERGY COLLECTOR APPARATUS

BACKGROUND OF THE INVENTION

1. Field of the Invention:

This invention relates to the collection of solar energy, and, more particularly, to the collection of solar energy by focusing the solar energy from a parabolic mirror into a conduit or pipe which is in physical contact with the parabolic mirror.

2. Description of the Prior Art:

A typical design of solar collector apparatus comprises a grid of pipes, either metal or plastic, usually painted black so as to absorb a maximum amount of radiant energy, connected in parallel with headers or manifolds at both ends of the pipe grid. The pipe grid, with headers, is generally disposed also on a black surface for again trapping a maximum amount of radiant energy. The diameter or size of each individual pipe is generally rather small. A fluid, typically water, flows through the apparatus and absorbs heat as it flows through the pipes. With a small volume of water moving in the pipes, maximum heat transfer is accomplished between the pipe and the water. A large volume of water is heated due to the size of the grid array.

The collector described in the preceding paragraph has numerous variations, primarily in the design of the headers and tube grids used. To increase the efficiency of such heater apparatus, the collectors may be installed at an angle with respect to the earth so as to optimize the angle of the radiation from the sun to the collector. For more sophisticated, but more expensive, arrays, the collector apparatus may even rotate from east to west to maintain as normal an inclination as possible with respect to the sun.

An alternate system to the array of pipes and headers is a spiral grid in which a conduit or pipe is arrayed in a spiral configuration with the coils of the spiral adjacent and touching each other. Again, the concept is to obtain a maximum efficiency in the collection of solar radiation, and such is accomplished by having the coils disposed adjacent each other. Fluid flowing through the coils is heated and may be transferred from a single coil to either a reservoir or to an adjacent coil where the temperature of the circulating fluid can be raised before being ultimately transferred to a reservoir.

Another type solar collector comprises a series of parallel parabolic channels with a pipe or tube disposed along the channel at the focal point of rays impinging on the parabolic reflector. A pipe or tube is disposed parallel to the channel at the focus of the parabolic curve to absorb the radiant heat impinging upon the reflective surface of the parabola and focused at the pipe or conduit. The radiant heat energy is thus concentrated along the pipe and transmitted to fluid flowing within the pipe.

Still another prior art apparatus comprises a series of convolutions or corrugations which are used as channels for a fluid to flow directly over them. That is, a fluid, such as water, flows by gravity within the corrugations or channels and absorbs heat energy from the corrugated sheet. This type of collector includes a transparent sheet, such as plastic, over the top of the apparatus to minimize evaporation of the fluid during the heat absorption of the fluid.

Obviously, all of the various types of solar collectors may be disposed at an angle to the earth for maximum radiation reception, and, if desired, may also pivot from east to west to maintain the desired normal orientation with the sun. If a solar collector is maintained in an orientation normal (perpendicular) to the sun, obviously maximum efficiency will be obtained with respect to the collection of solar energy.

SUMMARY OF THE INVENTION

The invention disclosed and claimed herein comprises solar energy collection apparatus having a parabolic mirror which reflects radiant energy to a pipe or conduit disposed at the focus of the parabolic collector and also in physical contact with the reflector, and a chamber for collecting heat is disposed at the rear of the parabolic collector to provide additional heat to the rear of the collector for absorption by the collector and ultimately by a fluid circulating in the pipe or conduit.

Among the objects of the present invention are the following:

To provide new and useful solar heat energy collector apparatus;

To provide new and useful solar heat collector apparatus including a parabolic reflector for reflecting solar energy;

To provide new and useful solar energy apparatus for transferring heat by reflection and by conduction;

To provide new and useful solar heat collection apparatus for collecting radiant energy by reflection from a parabolic surface and by conduction from contact with the surface;

To provide new and useful solar collection apparatus including a heat chamber for holding heat and for transferring the heat to a medium adjacent the chamber; and To provide new and useful solar energy collector apparatus for heating a flowing fluid by conduction, convection, and radiation.

BRIEF DESCRIPTION OF THE DRAWING

FIG. 1 is a perspective view of apparatus embodying the present invention.

FIG. 2 is an enlarged view in partial section, taken generally along line 2—2 of FIG. 1.

FIG. 3 is an enlarged fragmentary view of a portion of the apparatus of FIG. 2.

FIG. 4 is a view in partial section of an alternate embodiment of a portion of the apparatus of the present invention.

FIG. 5 is a side view of apparatus embodying the present invention schematically illustrating the use of the apparatus.

DESCRIPTION OF THE PREFERRED EMBODIMENT

FIG. 1 is a perspective view of solar apparatus 10 embodying the present invention. The solar collector apparatus 10 comprises a box 12 in which is disposed a plurality of parabolic mirrors 40 which a plurality of fluid conduits 50 disposed within and against each parabolic mirror 40. A pair of headers 60 and 70 are connected at opposite ends of each of the fluid conduits 50 and provide a supply of water or other fluid material to the conduits. For descriptive purposes, the header 60 may be considered as the supply header, and header 70 may be considered as the collector return header. The flow of fluid is supplied by the header 60, and from the header 60 the fluid flows into and through each of the conduits 50, and is collected or returned by the header 70 into which the fluid flows. A plurality of boxes 12 may be connected together in series, parallel, or the combination of both series and parallel, as desired, with the respective headers 60 and 70 connected to the headers of adjacent collector boxes.

In a series connected arrangement, a relatively small flow of fluid results a relatively high temperature rise in the fluid. In a parallel connected arrangement, a relatively high flow of fluid results in a relatively low temperature rise in the fluid. A combination of both series and parallel may result in a flow rate and temperature rise virtually anywhere between the two relative extremes.

The box 12 includes a pair of sides 14 and 16 joined by a pair of ends 18 and 20. The box also has a bottom 24 (see FIG. 2) and a transparent cover 22, which may be made of any appropriate transparent material which allows for the transmission of solar energy therethrough but which insulates the apparatus within the box from wind and other elements which could reduce the efficiency of the apparatus by removing heat and/or by allowing foreign material such as dirt, vapor, dead leaves, grass and the like to enter into the interior of the box to act as an insulator or in some other way lower the efficiency of the collector apparatus. For maximum efficiency, as for high temperature applications, a double pane transparent cover, such as glass, should be used to minimize the heat loss from within the collector apparatus.

If desired, the transparent cover 22 may be painted black to minimize heat loss at night. Short solar waves penetrate the black painted cover, such as black painted glass, but at night the longer heat waves will not escape easily through the black painted cover. Heat loss by radiation from within the box will accordingly be minimized. However, the minimizing of night losses must be considered against a reduction in efficiency during day operation due to increased heat absorption by the black painted cover and also due to the obstruction of some of the sun's rays by the cover which prevented penetration of radiation heat.

The box is of typical, generally ractangular configuration. It is disposed or oriented at an angle with respect to the plane of the earth. Illustrated in FIG. 1 is a stand 8 which tilts the box 12, and the parabolic mirror collector apparatus within the box, at an optimum angle with respect to the earth and to the sun to provide a maximum input of solar energy into the box. Preferably, the stand 8 will be adjustable to allow angular variations according to the latitude at which the apparatus is located and also with respect to the time of the year. Seasonal adjustments are of course necessary due to the changing solar angle between the earth and the sun.

Within the box, and beneath the parabolic mirror apparatus 40 is a layer of insulation 30 with a reflective layer 32 disposed on the top of the layer of insulation 30 and between the insulation and the bottom of the parabolic mirror apparatus 40. There is also a space between the insulation 30 with its reflective layer 32, and the bottom of the parabolic mirrors 40 to provide a space which acts as an oven for holding the heat which is not initially trapped by the mirror apparatus and transmitted directly to the fluid conduit 50. In order to maximize the efficiency of both the insulation and the space between the insulation and the parabolic mirror apparatus, the box 12 should be made of material, such as wood, which has low heat transmission characteristics, and which are accordingly relatively good insulators. Also, the box could be made of metal with insulation attached to its interior surfaces. This collector would have longer life than the wooden box, but also would be heavier and more expensive.

FIG. 2 is an enlarged view in partial section of the apparatus of FIG. 1 taken generally along line 2—2 of FIG. 1. The box 12 is shown in an enlarged cut away end view. With respect to the box, only one side, lower side 14, is shown. The bottom 24 is shown secured to the side 12.

Within the box 12 are shown two complete parabolic mirrors 40 and a partial portion of a third parabolic mirror. The parabolic mirrors are arranged parallel to each other within the box 12 and spaced apart from the bottom 24 of the box. Disposed against the bottom or base 24 of the box is a layer of insulation 30. On the top of the layer of insulation is a reflective layer 32. The insulation 30 and reflective layer 32 may be not unlike the typical foil backed wallboard used against outer walls of homes or buildings of typical construction. With the reflective layer 32 disposed toward the interior of the box, the heat coming into the box through the parabolic apparatus and not directly absorbed by the fluid flowing in the conduits is reflected by the reflective layer 32 and directed toward the bottom of the parabolic mirror apparatus.

Each parabolic mirror 40 includes a pair of sides 42 and 44 extending outwardly and upwardly from a bottom portion 46. The bottom 46 of each parabolic mirror is spaced apart from the insulation layer 30 within the box 12. The space or heat chamber between the insulation, with its reflective layer, and the parabolic mirrors is identified by reference numeral 26. Within the space or heat chamber 26, as illustrated in FIG. 2, are a plurality of squiggly arrows 38, which schematically represent the heat moving through the space 26, reflecting from the reflective layer 32 on the insulation 30 and directed toward the underneath surfaces of the parabolic mirrors 40.

The adjacent parabolic mirrors are secured together at the uppermost portions of the walls which define a peak 48. The adjacent parabolic mirrors are parallel to each other and are elongated to extend throughout the length of each box. The length of the box, and accordingly of the parabolic mirrors disposed therein, may vary as desired. The box 12, which comprises a housing for the collector apparatus, may be fabricated in any appropriate configuration to contain as many discrete parabolic mirror and conduit cells as desired. Accordingly, the length and width may vary as desired according to the mirror apparatus within the housing. Due consideration may be given to weight, handling ease, location of erection, and other considerations.

The housing or box 12 includes several portions, such as the primary area of heat energy collection, which comprises the portion of the housing or box between the transparent cover 22 and the mirrors 40, and the heat chamber 26, which is a secondary area of heat energy collection. The latter portion of the housing or box is between the mirrors 40 and the insulation 30 and its reflective layer 32.

The parallel parabolic mirrors may be fabricated as corrugated sheet metal is fabricated or in some other, appropirate manner. Aluminum or galvanized sheet metal with a reflective or bright finish, or some other appropriate material may be used for the parabolic mirrors.

Within each parabolic mirror 40, and disposed against the bottom 46 of the mirror, which is the vertex of the mirror, is a fluid conduit 50, illustrated as being a typical circular pipe in which is flowing a fluid 58. The circular pipe 50 extends throughout the length of the parabolic mirror 40. The lower or bottom portion of the conduit 50 which is adjacent or contiguous with the bottom portion 46 of the parabolic mirror 40 is identified by reference numeral 52. The extent of the contact between the bottom 46 of the parabolic mirror 40 and the bottom portion 52 of the fluid conduit 50 will depend on several factors, including the diameter of the pipe 50, and the radius of curvature of the parabolic mirror 40. Obviously, the greater the arcuate and linear lengths which comprise the area of contact between the fluid conduit and the parabolic mirror, the greater will be the amount of heat absorbed by the fluid through the conduit by direct conduction from the parabolic mirror. In this manner, the fluid conduit acts as a heat sink for the parabolic mirror.

An important consideration is the focal distance, which is the distance between the focus and the vertex of a parabola. The focal distance should be the same as the radius of the pipe or fluid conduit, so that the reflected solar radiation will be directed towards the center of the conduit. Accordingly, the parabolic mirror and fluid conduit must be appropriately designed and dimensioned to match each other.

In addition to the heat directly transferred from the mirror by conduction to the fluid conduit 50, heat energy is also transferred to the fluid conduit by reflection from the sides 42 and 44 of the parabolic mirror. In FIG. 2, solar radiation is indicated by a plurality of parallel dotted line arrows identified by reference numeral 80. Some of the solar radiation impinges directly on the fluid conduit 50, and other radiation impinges on the sides 42 and 44 of the parabolic mirror 40. The radiation which impinges upon the sides of the mirror is reflected from the mirror toward the center of the fluid conduit, which center comprises the focus of the parabola. Accordingly, the fluid conduit, which is preferably of metallic construction, such as copper pipe or tubing, or galvanized iron pipe, receives direct solar radiation, reflected solar radiation, as "direct" sources of heat, and as "indirect" sources of heat, the fluid conduit receives heat conducted through the mirror in the area of direct contact between the mirror and the fluid conduit. The heat thus absorbed by the direct contact is received from primarily two sources, the mirror and the heat chamber. The first source provides the heat absorbed by the mirror which is not reflected into the fluid conduit by the reflective surface of the mirror, and the second source provides the heat absorbed by the mirror from the heat chamber or space 26, as discussed above.

There is preferably a space beween the peaks 48, which comprises the juncture of adjacent sides of the parabolic mirrors 40, and the cover 22. However, if it is deemed desirable, as for providing support for the cover 22, the cover may be disposed upon the peaks 48.

The distance between the bottom 46 of each parabolic mirror and the reflective layer 32, which comprises the top of the insulation 30, may vary as desirable. The space or heat chamber 26 comprises an attic with respect to the accumulation of heat which is transmitted through the parabolic mirrors 40 and the heat is trapped thusly between the mirrors and the insulation. The resulting attic effect provides additional heat which is absorbed by the fluid conduit 50 and in turn transmitted through the fluid conduit to the fluid 58 within the conduit by direct contact with the parabolic mirrors 40.

FIG. 3 is an enlarged fragmentary view of a portion of the apparatus of FIG. 2, illustrating the heat energy transmission and the absorption thereof by the fluid 58 within the fluid conduit 50. The fluid conduit 50 is, of course, in direct physical contact at its bottom portion 52 with the parabolic mirror at its bottom portion or vertex 46. The conduit or pipe 50 may be secured to the parabolic mirror by any well known means, with a consideration of maximizing the heat transfer from the mirror to the conduit.

For greater heat absorption, or to increase the efficiency of the heat energy absorption, a layer of black paint 54 is disposed on the outer periphery of the fluid conduit 50 throughout its entire length. For example, if the fluid conduit 50 is a copper pipe or tube, the exterior periphery of the pipe or tube will be painted black to increase the efficiency of the absorption of heat energy by the pipe. In turn, there will be more heat energy per unit of time thus available to be absorbed by the fluid 58 within the pipe than if such black layer were not present. As is well known, a black surface tends to absorb more heat energy than does a surface of any other color. Phrased differently, other colors tend to reflect more heat than does the color black. Accordingly, the black layer 54 increases the efficiency of heat energy absorption from the solar radiation 80 which impinges directly on the conduit 50 and that which is reflected onto the conduit 50 from the sides 42 and 44 of the parabolic mirror 40. Moreover, the black coating also increases the efficiency of the heat energy transmitted by conduction from the bottom 46 of the parabolic mirror 40 to the conduit 50 through its bottom portion 52 which is in direct contact with the bottom 46 of the parabolic mirror.

The parabolic mirror 40 includes a highly reflective inside surface 41 against which the solar radiation 80 impinges. Most of the solar radiation falling on the reflective inside surface 41 is directed toward the focus of the parabolic mirror, which is disposed at the center of the fluid conduit 50. The heat energy thus reflected impinges on the black exterior layer 54 of the fluid conduit 50 and is absorbed by the fluid conduit and transferred to the fluid 58 flowing within the conduit 50.

The exterior or underneath surface of the parabolic mirror 40 commprises a black paint layer 49. The black paint layer or coating 49 has substantially the same purpose as does the exterior black paint layer 54 of the conduit 50, which simply is to enhance the absorption of heat energy by the mirror 40. Additionally, the layer 49 which is disposed within the box 12 and is subject directly to the space 26 and to the heat therein, helps to absorb heat energy, such as represented by the squiggly arrows 38 of FIGS. 2 and 3, as well as the heat energy which is not directly reflected by the reflective inide surface 41 of the parabolic mirror 40, but which penetrates into the mirror, such as illustrated by reference numeral 82 in FIG. 3. While some of the heat energy will escape from the parabolic mirror and will enter into the space 26, such loss will be minimized by the black paint layer 49. Of the energy which enters into the space 26, a substantial amount of such heat energy will be reabsorbed by the black layer 49 of the parabolic mirror and will subsequently be transmitted through the mirror to the fluid conduit 50.

As indicated previously, the greater the arcuate and linear length of the metal to metal contact between the conduit 50 and the parabolic mirror 40, the greater will be the heat transmission by conduction from the mirror to the conduit and ultimately into the fluid 58. An alternate embodiment of the apparatus of FIGS. 1-3 is illustrated in FIG. 4, which shows an extended area of metal to metal contact.

FIG. 4 is an enlarged fragmentary view of an alternate configuration of a fluid conduit 150 with a fluid 158 therein and a parabolic mirror 140 in partial section showing the extended area of direct contact between the mirror apparatus and the fluid conduit. Parabolic mirror apparatus 140 is substantially identical to the parabolic mirror apparatus 40 of FIGS. 1-3. However, fluid conduit 150 is not circular in cross section as is the fluid conduit 50 of FIGS. 1-3. Rather, the fluid conduit 150 is semi-oval in cross-sectional configuration, with a relatively flat bottom portion 152 in direct contact with the parabolic mirror 140. The bottom portion 152 is relatively flat, although it obviously has some curvature to it, so that the contact with the parabolic mirror apparatus 140 at its bottom portion 146 is over a greater radius than is the area of contact of the embodiment of FIGS. 1-3. The different between the embodiment of FIGS. 1-3 and the embodiment of FIG. 4 in terms of area of direct contact can be substantial, depending on the radius of curvature of the bottom portion 152 of the fluid conduit 150.

The area of actual contact beween the conduit and the mirror apparatus in the embodiment of FIGS. 1-3 is limited to a relatively few degrees of arc, depending on the specific embodiments of the parabolic mirror. However, in the embodiment of FIG. 4, the degree of arc of contact between the fluid conduit 150 and the mirror apparatus 140 at their respective bottom or contact portions 152 and 146 may be substantial, depending on not only the degree or radius of curvature of the parabolic mirror apparatus, but also on the actual configuration of the bottom portion 152 of the conduit 150. The longer the arc and area of contact, the greater will be the heat absorption by the conduit, and accordingly by the fluid 158 within the conduit, from the parabolic mirror apparatus. However, such enhanced efficiency must be countered by a consideration of the added expense in forming the configuration of the conduit 150, particularly with respect to its bottom portion 152 of direct contact, and with the mating configuration of the bottom portion 146 of the parabolic mirror apparatus 140.

The overall configuration of the fluid conduit 150, adjacent and remote from the bottom portion 152 which is in contact with the mirror 140, may be of any appropriate configuration, such as round, which implies a constant radius from some point within the conduit from adjacent the bottom portion 152 on one side thereof to a similar point oppositely. Or, the conduit may be relatively elliptical, as desired. Regardless of the specific configuration, the focus of the parabolic mirror should be located within or on the conduit 150 so that the conduit will be exposed to the solar radiation reflected from the parabolic mirror apparatus.

Preferably, the external periphery of the conduit 150 should include a black layer of paint to increase the rate of heat energy absorption. Similarly, the parabolic mirror 140 should include a layer of black on its surface remote from the interior surface which receives the solar radiation and which is also in direct contact over a portion thereof, with the conduit 150. Such layers are not shown in FIG. 4. The use of such black layer, preferably flat black, is well known and well understood in the art, and is discussed in detail above in conjunction with FIG. 3.

FIG. 5 is a side view of the solar collector housing or box 12 shown disposed at an angle to a plurality of parallel rays of solar radiation 80. The box 12 is shown disposed substantially perpendicular to the radiation 80, or with its bottom 24 substantially perpendicular to the radiation. As shown in FIG. 2, the longitudinal axis of the parabolic mirrors 40 and of the fluid conduits 50 are substantially parallel to each other and also parallel to the bottom 24 of the box 12. Accordingly, the parabolic mirrors and the fluid conduits are subject to the most direct solar radiation rays when the bottom 24 of the box 12 is, and the longitudinal axes of the mirrors and conduits therein are, disposed substantially perpendicular to such solar radiation.

The bottom 24 of the box or housing 12 is shown in FIG. 5 as tipped on an angle with respect to horizon 6. The angle between the horizon and the box, or more specifically between the horizon and the bottom of the box, is preferably the noon solar angle or the most efficient angle with respect to the collection of the solar radiation. This angle of course takes into consideration the altitude of the sun above the horizon and accordingly allows the altitude of the box or housing to be oriented with the bottom of the housing and the mirrors within the housing substantially perpendicular to the rays of the sun, as discussed above. In addition to being angularly disposed heightwise and with respect to the horizon, the collector boxes may also be angularly moved with respect to the arc of the sun as it courses through the sky from horizon to horizon rather than merely being focused stationary and perpendicular to the sun at the noon hour. Such sun tracking apparatus is well known and is well understood. However, again the feasability of using such tracking equipment, which is relatively expensive, should be balanced against the realities of the cost involved and the efficiency of the solar collector apparatus.

As indicated previously, a plurality of solar collector cells, such as housing 12, with its plurality of parabolic mirrors and fluid conduits disposed within each cell, may be ganged together in an array. Such array may include vertical ganging, such as with respect to FIG. 1, with the headers 60 and 70 being axially aligned, and also in a horizontal type ganging disposition, with adjacent headers connected together. Obviously, depending on the location, space available, and many other factors, various arrangements may be utilized to maximize or optimize the amount of solar energy collected. With respect to the flow of fluid through an array, or even through a single cell, gravity feed may be utilized in conjunction with a pump, or a multiplicity of pumps may be used, as desired. Such features with respect to the specific arrays and with the movement or flow of the fluid are well known and understood, and are accordingly not part of the present invention.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. For example, the interior of the housing, comprising the sides of the heat chamber adjacent the insulation and also above the heat chamber and adjacent the mirrors may include a reflective coating to further enhance the reflection of the heat energy and its subsequent absorption, ultimately by the fluid in the conduits. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Apparatus for collecting solar energy comprising, in combination:
   parabolic mirror means for collecting and reflecting solar energy, including a vertex and a focus spaced apart from the vertex;
   fluid conduit means disposed on the parabolic mirror means over a predetermined arcuate length adjacent the vertex for absorbing energy from the parabolic mirror means and extending from the vertex to the focus;
   heat chamber means disposed adjacent the parabolic mirror means for containing heat energy and for providing the contained heat energy for the parabolic mirror means for transmittal to the fluid conduit means; and
   a fluid disposed in the fluid conduit for absorbing heat energy from the fluid conduit means.

2. The apparatus of claim 1 in which the heat chamber means includes housing means and the parabolic mirror means is disposed in the housing means.

3. The apparatus of claim 2 in which the housing means includes a transparent cover over the parabolic mirror means.

4. The apparatus of claim 3 in which the parabolic mirror means includes a pair of sides and the vertex is disposed between the joining the pair of sides, and each of the sides of the pair includes a reflective surface facing the transparent cover for reflecting solar radiation, and the sides are oriented to reflect solar radiation towards the fluid conduit at the focus.

5. The apparatus of claim 4 in which the parabolic mirror means further includes a coating remote from the reflective coating for enhancing the absorption of heat energy.

6. The apparatus of claim 5 in which the fluid conduit means includes a coating for enhancing the absorption of heat energy.

7. The apparatus of claim 6 in which the fluid conduit means is secured to the parabolic mirror means at its vertex and extends to the focus of the parabolic mirror means.

8. The apparatus of claim 7 in which the heat chamber includes insulation means remote from the parabolic mirror means and disposed on a portion of the housing means to prevent heat energy from escaping from the heat chamber other than through the parabolic mirror means.

9. The apparatus of claim 8 in which the insulation means includes a reflective layer facing the parabolic mirror means.

10. Solar heat energy collector apparatus, comprising, in combination:
    housing means;
    primary heat energy collection means disposed within the housing means and including
        parabolic mirror means having a pair of sides connected together at a vertex defining a radius of curvature of a predetermined arcuate length between the sides, and having a focus and a reflective surface for collecting heat energy and for reflecting solar radiation towards the focus of the parabolic mirror means, and
        conduit means having a radius of curvature over an arcuate distance substantially the same arcuate distance as the radius of curvature of the vertex of the parabolic mirror means, for absorbing heat energy disposed at the focus of the parabolic mirror means and extending into contact with the parabolic mirror means at the vertex of the parabolic mirror means over a predetermined arcuate length for collecting solar radiation reflected by the parabolic mirror means and for collecting heat energy conducted through the parabolic mirror means;
    secondary heat energy collection means disposed within the housing means and including a heat chamber adjacent the parabolic mirror means for collecting heat energy and for providing a secondary source of heat for the parabolic mirror means; and
    a fluid in the conduit means for receiving the heat energy from the conduit means.

11. The apparatus of claim 10 in which the parabolic mirror means includes a black coating remote from the reflective surface.

12. The apparatus of claim 11 in which the conduit means includes a black coating to enhance the collecting and absorbing of heat energy.

13. The apparatus of claim 12 in which the housing means includes a transparent cover over the parabolic mirror means.

* * * * *